(12) United States Patent
Mitamura

(10) Patent No.: US 7,340,126 B2
(45) Date of Patent: Mar. 4, 2008

(54) WAVELENGTH SELECTIVE OPTICAL SWITCH

(75) Inventor: Nobuaki Mitamura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/319,643

(22) Filed: Dec. 29, 2005

(65) Prior Publication Data

US 2006/0215955 A1 Sep. 28, 2006

(30) Foreign Application Priority Data

Mar. 24, 2005 (JP) .............................. 2005-085151

(51) Int. Cl.
*G02B 6/24* (2006.01)
*G02B 26/08* (2006.01)

(52) U.S. Cl. ...................................... 385/18

(58) Field of Classification Search ................. 385/18
See application file for complete search history.

(56) References Cited

U.S. PATENT DOCUMENTS 6,289,145 B1 * 9/2001 Solgaard et al. ............. 385/17
6,501,877 B1 12/2002 Weverka et al.
6,549,699 B2 4/2003 Belser et al.
6,600,849 B2 * 7/2003 Ducellier et al. ............. 385/17

FOREIGN PATENT DOCUMENTS

JP 2003/515187 4/2003
WO 01/37021 5/2001

* cited by examiner

*Primary Examiner*—Kevin S Wood
*Assistant Examiner*—Jerry T Rahll
(74) *Attorney, Agent, or Firm*—Bingham McCutchen LLP

(57) ABSTRACT

A wavelength selective optical switch according to the present invention detects wavelengths of signal lights input to a signal light input port in a main body portion which performs the switching of optical paths for each wavelength by an angular control of a plurality of mirrors, and also, monitors the intensity of a monitor light which is generated in an internal light source and is given from a monitor light input port disposed in the main body portion to be led to a monitor light output port, to feedback control a reflecting surface angle of the mirror corresponding to the wavelength of the signal light which is not input to the signal light input port, so that the output intensity of the monitor light becomes maximum. As a result, it is possible to reliably control the reflective surface angle of the mirror corresponding to the wavelength of the signal light which is not input, and therefore, the crosstalk doe not occur even when the signal light is newly input.

20 Claims, 16 Drawing Sheets

FIRST EMBODIMENT
(ENTIRE CONFIGURATION DIAGRAM)

FIRST EMBODIMENT
(SIDE VIEW FROM A-DIRECTION)

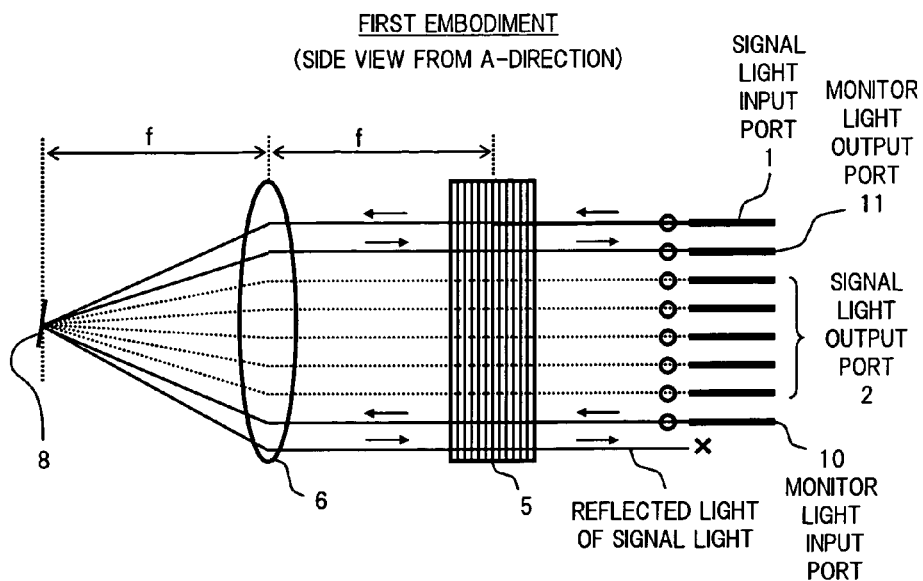
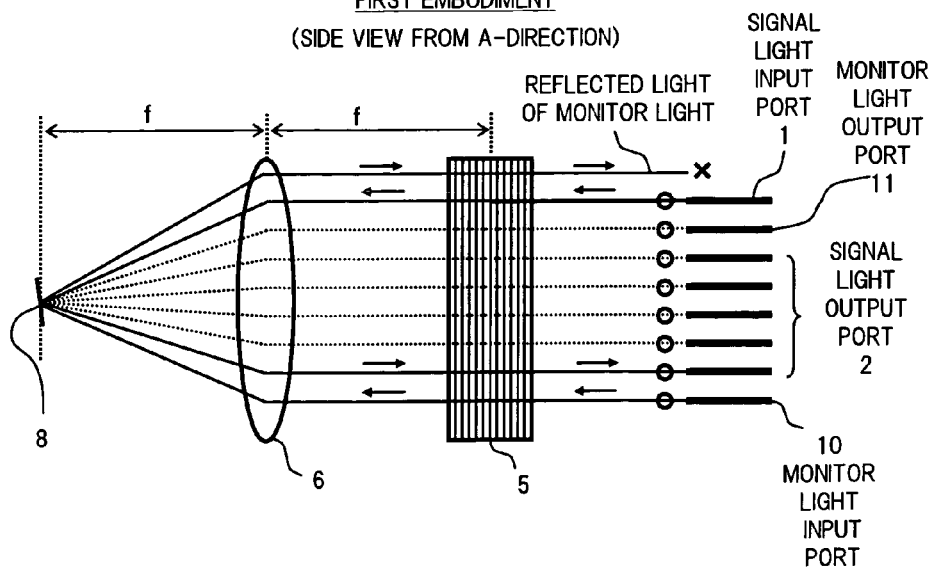

SECOND EMBODIMENT
(SIDE VIEW FROM A-DIRECTION)

THIRD EMBODIMENT
(SIDE VIEW FROM A-DIRECTION)

FIFTH EMBODIMENT
(TOP VIEW)

FIFTH EMBODIMENT
(SIDE VIEW FROM B-DIRECTION)

FIFTH EMBODIMENT
(TOP VIEW)

FIFTH EMBODIMENT
(SIDE VIEW FROM B-DIRECTION)

SIXTH EMBODIMENT
(TOP VIEW)

SIXTH EMBODIMENT
(SIDE VIEW FROM B-DIRECTION)

SIXTH EMBODIMENT
(TOP VIEW)

SIXTH EMBODIMENT
(SIDE VIEW FROM B-DIRECTION)

(TOP VIEW)

(SIDE VIEW FROM A-DIRECTION)

(SIDE VIEW FROM A-DIRECTION)

(SIDE VIEW FROM A-DIRECTION)

WAVELENGTH SELECTIVE OPTICAL SWITCH

BACKGROUND OF THE INVENTION

1. Field of the Invention

The present invention relates to a wavelength selective optical switch for branching a signal light of arbitrary wavelengths for each wavelength at a node in a large-scale photonic network to which a plurality of wavelength division multiplexing networks is connected.

2. Description of the Related Art

With the rapid diffusion of high-speed access networks having bands of several to 100 Mbit/s or so, such as recent FTTH (Fiber to The Home) or ADSL (Asymmetric Digital Subscriber Line), an environment capable of enjoying broadband Internet services is being developed. In order to deal with an increase of the telecommunication needs thereof, in the backbone network (core network), the laying of ultra-large capacity communication system using the wavelength division multiplexing technology is being progressed.

On the other hand, in a connecting portion between the metro-network and this core network, since a limit of switching ability by the electricity still remains, an occurrence of band bottleneck in this portion is feared. Therefore, it is considered to be effective that a new optical switching node is installed in the metro region where the band bottleneck occurs, to construct the new photonic network architecture for directly connecting the access network and the core network using an optical region, without using the electric switch.

A function of selecting to switch a particular wavelength from one fiber has been treated as important as a function of the optical switching, and a switching device for realizing such a function is called a wavelength selective optical switch. As specific applications of this wavelength selective optical switch, there are for example, a wavelength selective optical router for controlling and routing signal lights of individual wavelengths from an input fiber to an output fiber, a wavelength selective optical node bypass for controlling to bypass the particular wavelength from one fiber to an alternate fiber, a wavelength selective add/drop for controlling the adding/dropping of the particular wavelength to/from one fiber.

As a conventional wavelength selective optical switch, as shown in FIG. 23 to FIG. 25 for example, there is known the one comprising a signal light input port 1 and a plurality of signal light output ports 2, each consisting of a collimate lens 3 and an optical fiber 4, a diffraction grating 5, a lens 6 and a mirror array 7 consisting of a plurality of micro-mirrors 8 (refer to U.S. Pat. No. 6,549,699 and Japanese National Publication No. 2003-515187). Note, FIG. 23 is a perspective view of the conventional wavelength selective optical switch, FIG. 24 is a top view thereof and FIG. 25 is a side view from A-direction of FIG. 24.

This conventional wavelength selective optical switch realizes the above described wavelength selective optical switch function, based on the operational principle in which parallel signal lights (collimate beams) of different wavelengths of M in number, which are emitted from the signal light input port 1, are separated to different angular directions by the diffraction grating 5, and thereafter, are condensed on different positions by the lens 6 (refer to FIG. 23 and FIG. 24), and the respective optical beams are reflected at desired angles by the mirror array 7 consisting of the M micro-mirrors 8 having angles variable due to the electrostatic attraction or the like, which are arranged on condensing positions of the respective optical beams passed through the lens 6, to be led to desired signal light output ports 2 (refer to FIG. 23 and FIG. 25).

At this time, the respective micro-mirrors 8 of the mirror array 7 need to be angularly adjusted so that the optical beams return the desired signal light output ports 2. Therefore, there has been conventionally used, for example, a method of detecting the angles of respective micro-mirrors 8 with the capacitance or the like to perform a feedforward control, a method of performing a feedback control so that the output intensity at the signal light output port for the desired wavelength becomes maximum, or the like. However, in the former feedforward control, there is a problem in that the micro-mirrors 8 cannot retain optimum angles if the capacitance is changed with time. Therefore, the latter feedback control is generally used.

In the case where the wavelength selective optical switch is operated in the actual network, such a case where signal lights of all reactive wavelengths (channels) are necessarily operated from an initial stage of the service-in is rare. As shown in an optical path indicated by the broken line in FIG. 24, there are many cases where the wavelength which is not in the service-in (dark channel) exists. In such a case, even when the signal light of the wavelength which has not been in service-in is newly in the service-in, the wavelength selective optical switch needs to appropriately start the switching operation without the interference or the crosstalk. Further, in the applications such as the wavelength selective optical router and the like, there is a case where the wavelengths or the number of wavelengths of the signal lights input to the wavelength selective optical router are frequently changed according to the switching status of routes. Even in such a case, needless to say, the wavelength selective optical router needs to operate without the interference or the crosstalk.

However, in the configuration of the above described conventional wavelength selective optical switch, if there exists the wavelength (dark channel) though which the input signal is not input to the wavelength selective optical switch, since any light does not reach the micro-mirror 8 by which the optical beam of this wavelength should be originally reflected, it is impossible to detect the angle of the micro-mirror 8 with the optical output intensity. Therefore, the feedback control of the angles of the micro-mirrors 8 as described above cannot be performed, and also, the information on the states of the angles of the micro-mirrors 8 cannot be obtained. FIG. 26 is a side view similar to FIG. 25, and shows by the broken line a route passing the micro-mirror 8 corresponding to the dark channel under the above status. Then, if the signal light of a new wavelength is input to the wavelength selective optical switch under this status, as shown by the solid line in FIG. 27, there is a possibility that the light is output to an unintended signal light output port. Therefore, there is a possibility of a serious problem of the occurrence of crosstalk.

SUMMARY OF THE INVENTION

The present invention has been accomplished in view of the above problems and has an object to provide a wavelength selective optical switch with a simple configuration, capable of reliably controlling an angle of a reflecting surface of a mirror corresponding to a wavelength through which a signal light is not input, and of avoiding the crosstalk when the signal light is newly input.

In order to achieve the above object, the present invention provides a wavelength selective optical switch which includes optical path switching means provided with a plurality of mirrors on which signal lights of respective wavelengths contained in a wavelength division multiplexed light are incident, for controlling angular variable reflecting surfaces of the respective mirrors to switch optical paths for the signal lights reflected by the respective mirrors to arbitrary directions for each wavelength, comprising: wavelength detecting means for detecting the wavelengths of the signal lights input to the optical path switching means; monitor light generating means for generating a monitor light for monitoring and controlling the reflecting surface angles of the plurality of mirrors, irrespectively of the wavelengths of the signal lights input to the optical path switching means; a monitor light input port to which the monitor light from the monitor light generating means is input; a monitor light output port to which the monitor light emitted from the monitor light input port and reflected by the respective mirrors of the optical path switching means is coupled; monitor light intensity detecting means for detecting the intensity of the monitor light output from the monitor light output port; and control means for feedback controlling, for the wavelength of the signal light capable of being contained in the wavelength division multiplexed light, which is not input to the optical path switching means, the reflecting surface angle of the corresponding mirror in the optical path switching means based on detection results of the wavelength detecting means and the monitor light intensity detecting means, so that the intensity of the monitor light output from the monitor light output port becomes maximum.

In the wavelength selective optical switch of the above configuration, for the wavelength of the signal light which is not input to the optical path switching means, the reflecting surface angle of the corresponding mirror can be reliably controlled utilizing the monitor light.

According to the wavelength selective optical switch of the present invention as described in the above, with the simple configuration using the monitor light, even when the signal light which has not been input to the optical path switching means is newly input, it becomes possible to provide the wavelength selective optical switch which does not occur the crosstalk.

The other objects, features and advantages of the present invention will be apparent from the following description of the embodiments with reference to the accompanying drawings.

BRIEF DESCRIPTION OF THE DRAWINGS

FIG. 3 is another side view for explaining an operation of the first embodiment;

FIG. 4 is a further side view for explaining the operation of the first embodiment;

DETAILED DESCRIPTION OF THE INVENTION

Figure 1:
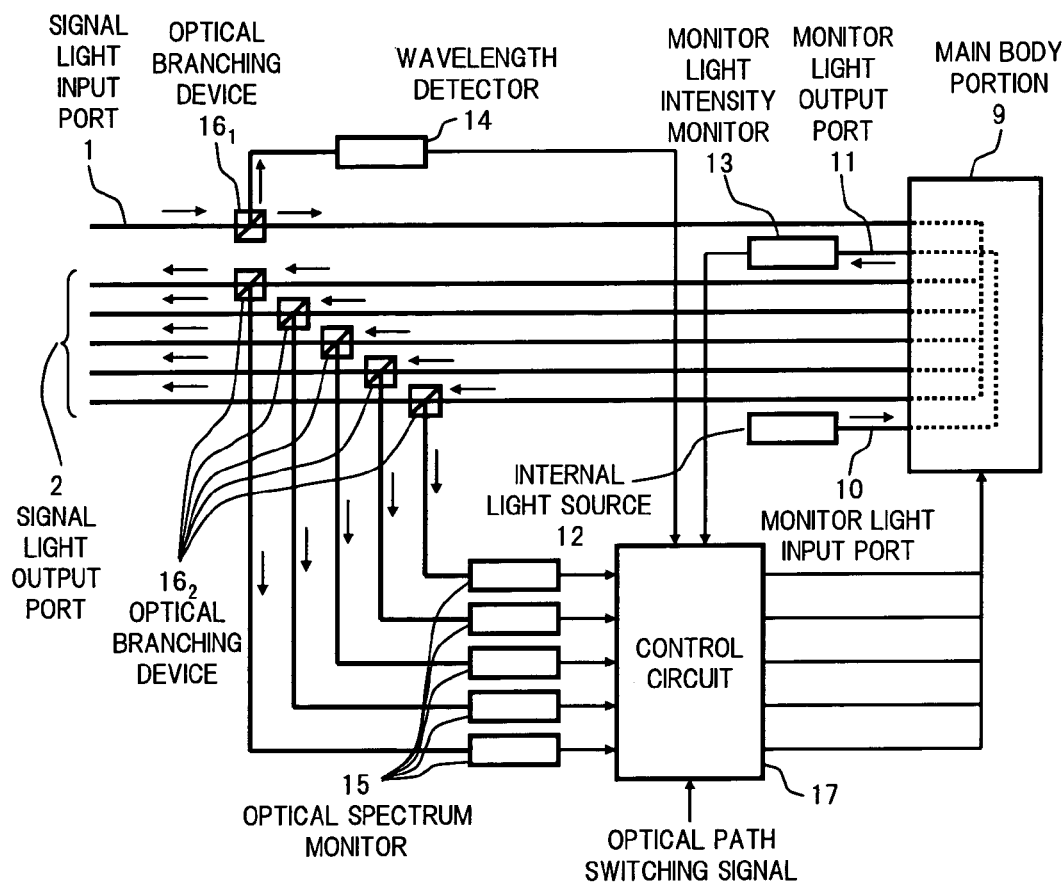
FIG. 1 is a schematic diagram showing the entire configuration of a first embodiment according to the present invention.

Hereinafter, embodiments of the present invention will be described with reference to drawings. The same reference numerals denote the same or equivalent parts in all drawings.

FIG. 1 is a schematic diagram showing the entire configuration of a first embodiment of a wavelength selective optical switch according to the present invention.

Figure 23:
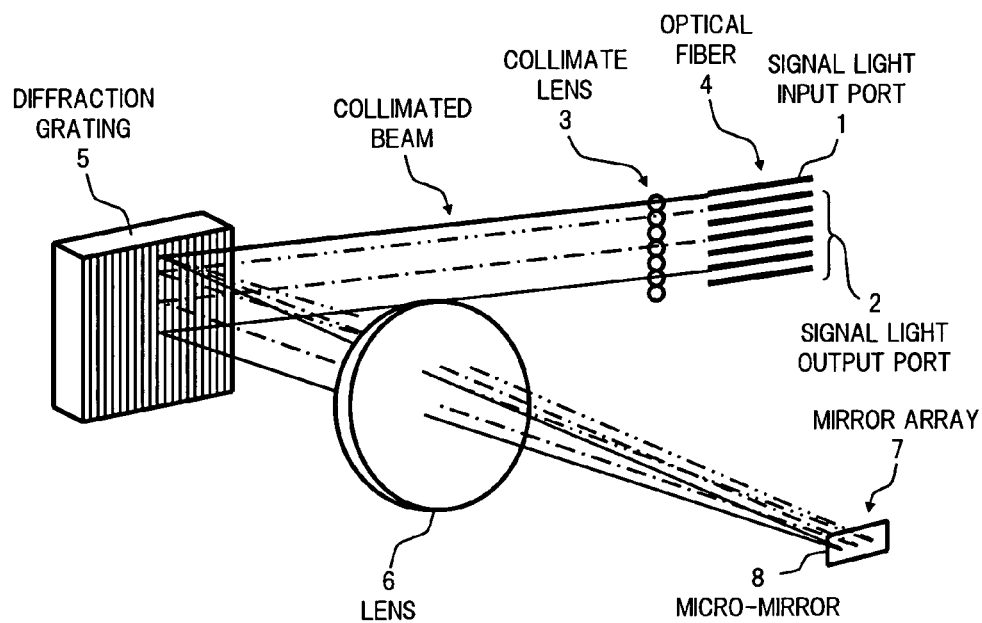
FIG. 23 is a perspective view showing a configuration example of a conventional wavelength selective optical switch.

In FIG. 1, a wavelength selective optical switch in a first embodiment comprises, in addition to a signal light input port 1 to which a wavelength division multiplexed signal light is input and a plurality of signal light output ports 2, a monitor light input port 10 to which a monitor light is input and a monitor light output port 11 from which the monitor light is output, as an input and output port configuration of a main body portion 9 basically provided with a configuration similar to that of the conventional wavelength selective optical switch shown in FIG. 23. Herein, the main body portion 9 includes a function as optical path switching means.

To the monitor light input port 10, an internal light source 12 as monitor light generating means is connected via an optical fiber. The internal light source 12 is disposed for monitoring and controlling angles of micro-mirrors independent of wavelengths of the monitor light input to the monitor light input port 10. Here, a broadband white light source, for example, LED, ASE or the like, is used as the internal light source 12. Further, a monitor light intensity monitor 13 as monitor light intensity detecting means for monitoring the intensity of the monitor light output from the monitor light output port 11 is connected via the optical fiber to the monitor light output port 11.

Note, in the wavelength selective optical switch of the present invention, the spatial arrangement of the monitor light input port 10 and the monitor light output port 11, and also, the signal light input port 1 and the plurality of signal light output port 2, becomes important. A plurality of specific arrangement examples thereof will be described later in detail.

Further, to the wavelength selective optical switch in the present embodiment, a wavelength detector 14 as wavelength detecting means for detecting the wavelengths of the signal lights input to the signal light input port 1 is connected via an optical branching device $16_1$, which is inserted onto the optical fiber between the signal light input port 1 and the main body portion 9. Moreover, to the wavelength selective optical switch, a plurality of optical spectrum monitors 15 for monitoring the spectrums of the signal lights respectively output from the plurality of signal light output ports 2 is connected via optical branching devices $16_2$ which are inserted onto the optical fibers between the main body portion 9 and the respective signal light output ports 2.

In addition, the wavelength selective optical switch in the present embodiment includes a control circuit 17 as control means capable of controlling, among the plurality of micro-mirrors 8 in the main body portion 9 (refer to FIG. 23 or FIG. 24), an angle of the one corresponding to a wavelength (dark channel) of a signal light which is not input to the signal light input port 1, so that the intensity of the monitor light output from the monitor light output port 11 becomes maximum. The control circuit 17 is electrically connected to the monitor light intensity monitor 13, the wavelength detector 14, the optical spectrum monitor 15 and the main body portion 9, to perform, in the same way as in the conventional technology, a feedback control of the micro-mirrors 8 based on the intensity of the signal lights output from the respective signal light output ports 2, in addition to an angle control of the micro-mirrors 8 based on the intensity of the monitor light. The control of the micro-mirrors 8 by the control circuit 17 will be described later in detail.

Figure 2:
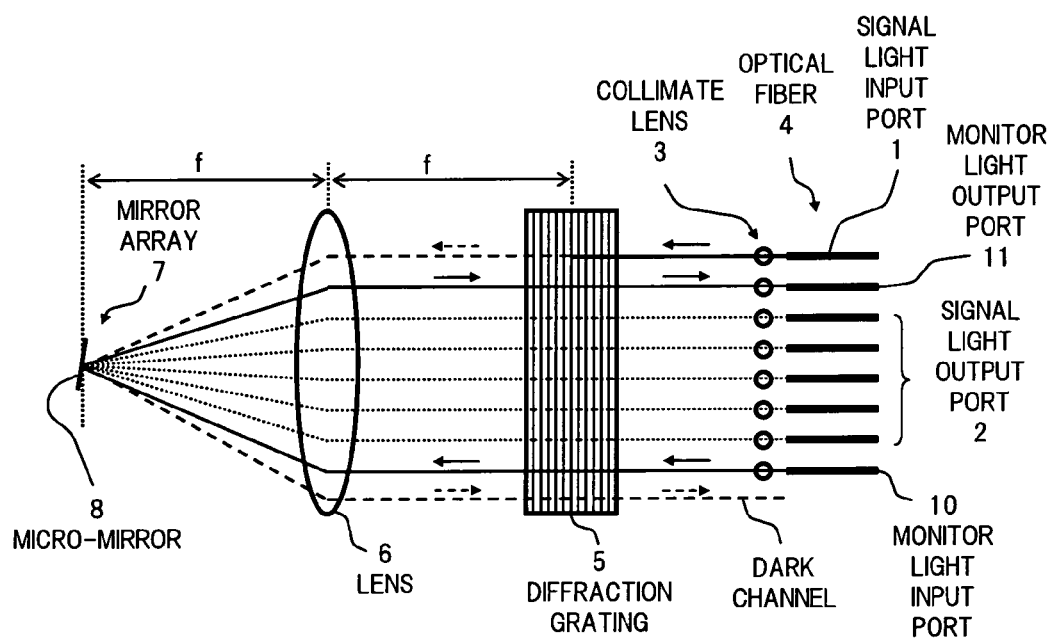
FIG. 2 is a side view for explaining a configuration and an operation of a main body portion in the first embodiment.

FIG. 2 to FIG. 4 show a detailed configuration of the main body portion 9 in FIG. 1. Similarly to FIG. 25 described in the above, FIG. 2 to FIG. 4 are side views of the configuration of the main body portion 9 from A-direction (refer to FIG. 24).

Figure 25:
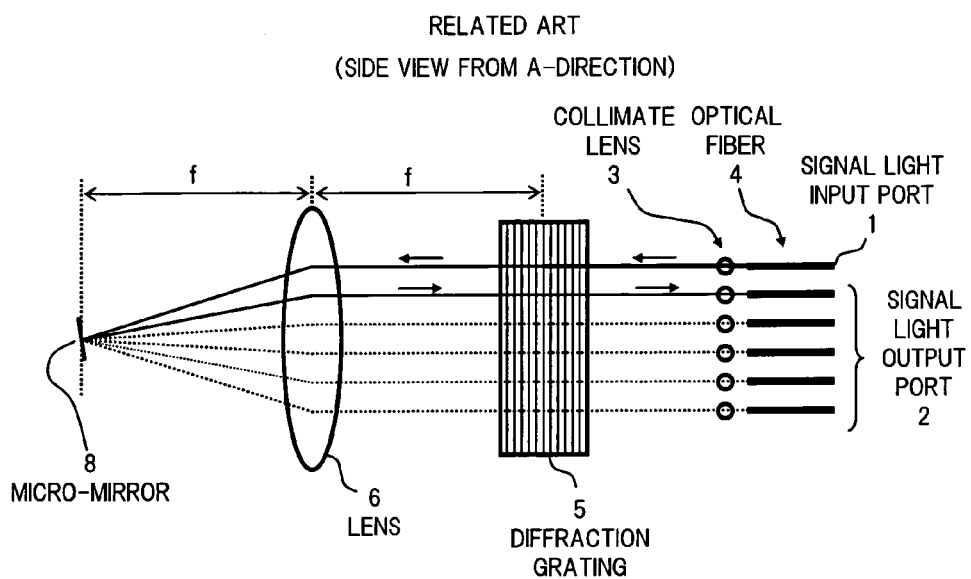
FIG. 25 is a side view of FIG. 24 from A-direction.
Figure 26:
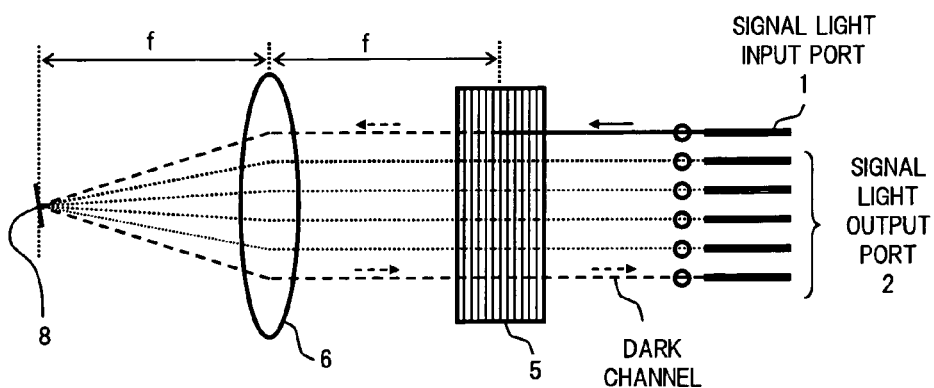
FIG. 26 is another side view for explaining the operation of the conventional wavelength selective optical switch.
Figure 27:
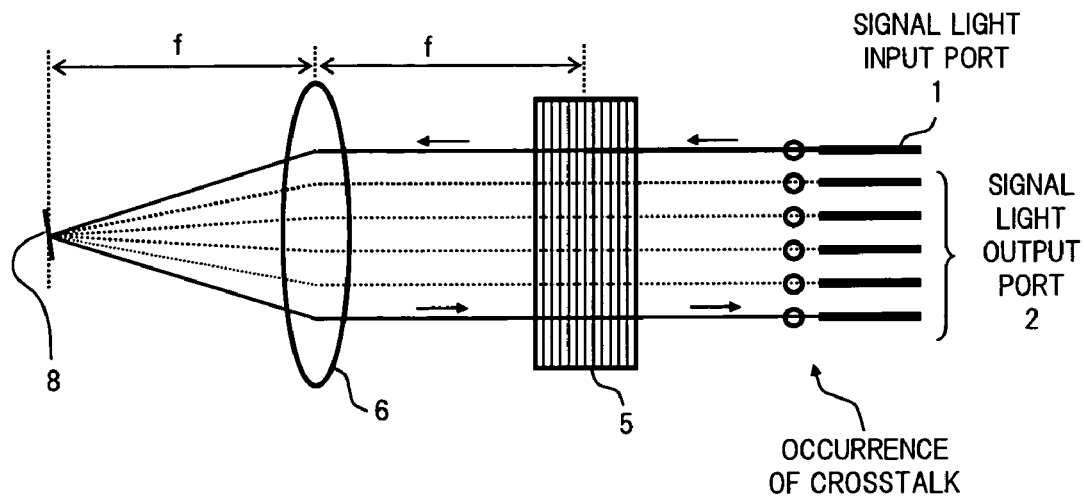
FIG. 27 is a further side view for explaining the operation of the conventional wavelength selective optical switch.

As shown in each figures, the main body portion 9 has the configuration same as the conventional configuration shown in FIG. 25, except for that the monitor light input port 10 and the monitor light output port 11 is added, and comprises the signal light input port 1, a diffraction grating 5, a lens 6, a mirror array 9 consisting of the angle variable micro-mirrors 8 of M in number equal to the maximum number of wavelengths capable to be input (arranged in a vertical direction with respect to the papers in FIG. 2 to FIG. 4), and signal light output ports 2 of N in number (here, one example of N=5 is shown). Here, the diffraction grating 5 and the micro-mirrors 8 are installed with respect to the lens 6, on positions of substantial focal distance f of the lens 6.

Further, in the present embodiment, with regard to the arrangement of each port, the signal light input port 1, the monitor light output port 11, the plurality of signal light output ports 2 and the monitor light input port 10 are arranged on a straight line in this order, so that, when the signal lights emitted from the signal light input port 1 are reflected by the micro-mirrors 8 which are feedback controlled according to the output intensity of the monitor light from the monitor light output port 11, reflected lights of the signal lights are not coupled to the plurality of signal light output ports 2, and also, so that, when the monitor light emitted from the monitor light input port 10 is reflected by the micro-mirrors 8 which are feedback controlled according to the output intensity of the signal lights from the signal light output ports 2, reflected lights of the monitor light are neither coupled to the signal light input port 1 nor the plurality of signal light output ports 2.

Note, the order of each port arrangement may be made in reverse to the above order. Further, the space between each port is desirable to be narrowed in order to reduce an angular movable range of each micro-mirror 8. Herein, the space between each port is made narrow to the extent possible, and also, each port is arranged at substantially even spaces.

Here, there will be described an operation of the wavelength selective optical switch in the present embodiment.

In the present wavelength selective optical switch, a method of selectively outputting the signal lights of respective wavelengths (sometimes, to be referred to as wavelength signal lights, hereunder), which are input to the signal light input port 1, from desired signal light output ports 2 is similar to that in the conventional wavelength selective optical switch described in the above. However, this method will be described step by step in the following, while appropriately referring to FIG. 23 and FIG. 24 described in the above, since such a description is helpful for understanding the function and effect of the present wavelength selective optical switch.

Figure 24:
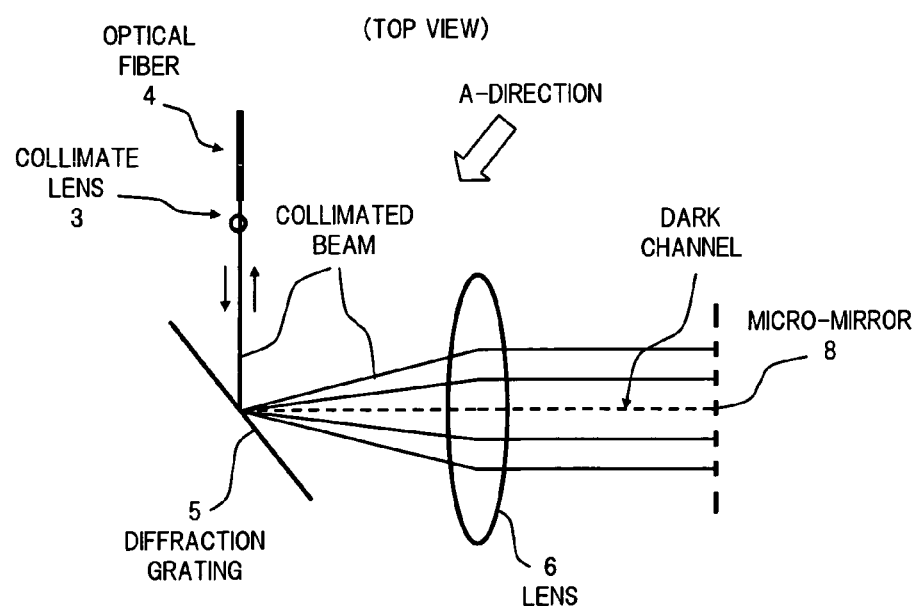
FIG. 24 is a top view for explaining an operation of the conventional wavelength selective optical switch.

Firstly, the wavelength signal lights of M in number are input to the optical fiber 4 of the signal light input port 1, and a light emitted from the optical fiber 4 becomes a parallel optical beam (collimated beam) by the collimate lens 3. The wavelength signal lights of M in number being one parallel beam are diffracted to be separated to different angle directions (horizontal direction in FIG. 23) according to the wavelengths by the reflective type diffraction grating 5, and are divided Into a plurality of parallel beams whose traveling directions (angles) are different from each other (FIG. 23 and FIG. 24).

The M wavelength signal lights whose traveling directions (angles) are different from each other are condensed by the lens 6 on different portions (positions deviated to the horizontal direction in FIG. 23). At this time, since the diffraction grating 5 is installed on the position of substantial focal distance f of the lens 6, the M wavelength signal lights are condensed while being deviated in parallel to each other (FIG. 24). Further, if the M wavelength signal lights whose traveling directions (angles) are different from each other, each has the equal frequency intervals as generally used in the WDM transmission, the respective wavelength signal lights are condensed while being aligned at substantially equal intervals. However, strictly speaking, even at the equal frequency intervals, the wavelength spacing is not equal. Further, in the principle of the diffraction grating 5, since the spacing between each optical beam divided according to the wavelength is not equal, the spaces between the condensing positions of the wavelength signal lights are slightly deviated.

The M wavelength signal lights are reflected independently at desired angles in a vertical direction in FIG. 23, by the M angle variable micro-mirrors 8 arranged on the condensing positions of the wavelength signal lights. At this time, an angle between the optical beam and the micro-mirror 8 when viewed from above in FIG. 23 is made perpendicular to each other. Namely, when viewed from above in FIG. 23, it seems that the optical beams incident on the micro-mirrors 8 are reflected to the exactly same direction to return (FIG. 24). Further, the angles of the micro-mirrors 8 are set to be equiangular and also to be variable in up to N stages same as the number of the signal light output ports 2. To be specific, in the case where each micro-mirror 8 is a movable mirror of electrostatic attraction type for example, the micro-mirror 8 is given with the predetermined electric power, to present a predetermined angle.

The respective optical beams reflected by the micro-mirrors 8 are returned to the lens 6, and again becomes the parallel beam (FIG. 23). At this, since the micro-mirrors 8 are installed on the positions of substantial focal distance f of the lens 6, the optical beams of up to N in number reflected according to the angles of the micro-mirrors 8 are deviated in parallel to the vertical direction in FIG. 23. Further, since the angles of the micro-mirrors 8 are set to be equiangular and to be variable in stepwise, deviations of the optical beams in the vertical direction are at equal spacing.

The optical beams of up to N in number deviated at equal spacing in the vertical direction in FIG. 23 again return to the diffraction grating 5. At this time, the respective optical beams are again incident on the diffraction grating 5 at angles same as the angles (angles in the horizontal direction in FIG. 23) at which the optical beams have been emitted from the diffraction grating 5 on an outward route. Therefore, the respective optical beams are diffracted while being deviated at equal spacing in the vertical direction in FIG. 23, to directions (angles) same as the directions (angles) of when the optical beams have been incident on the diffraction grating 5 from the signal light input port 1 on the outward route (FIG. 24). Then, the optical beams passed through the diffraction grating 5 are respectively coupled to the optical fiber 4 via the collimate lenses 3 aligned at even spaces in the vertical direction in FIG. 23, to be respectively output from the N signal light output ports 2.

Thus, the present wavelength selective optical switch is capable of selectively outputting the wavelength signal lights input to the signal light input port 1, from the desired signal light output ports 2 according to the angles of the micro-mirrors 8.

Next, there will be described in detail an operation of the present wavelength selective optical switch, in which the crosstalk does not occur when a new wavelength signal light is input, using a flowchart in FIG. 5, and FIG. 1 to FIG. 4.

Figure 5:
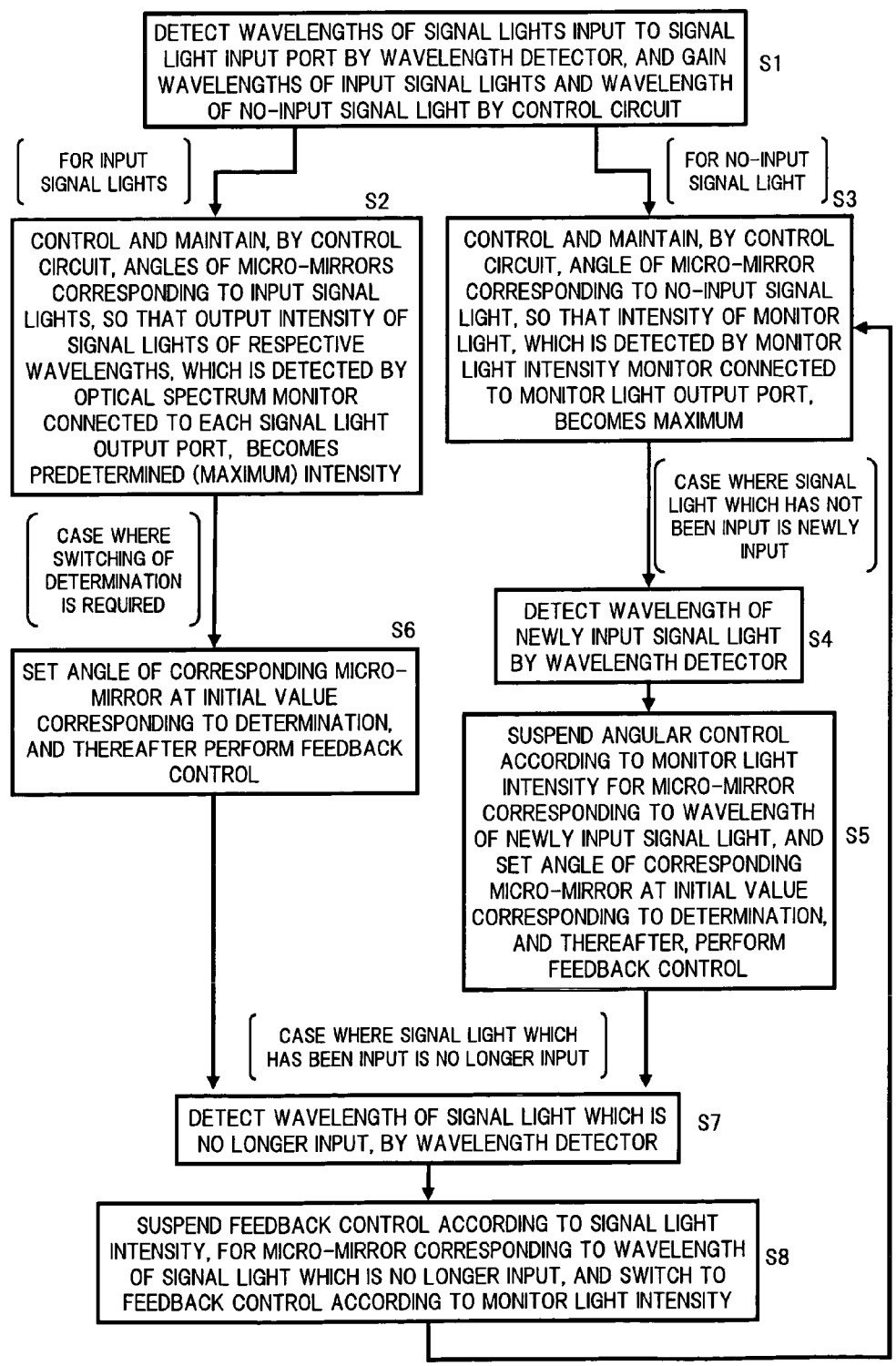
FIG. 5 is a flowchart for explaining the operation of the first embodiment.

Firstly, the wavelengths of the signal lights input to the signal light input port 1 are detected by the wavelength detector 14 connected to the signal light input port 1 via the optical branching device $16_1$, and based on a detection result, the control circuit 17 gains the information relating to the wavelengths of the signal lights which are input to the signal light input port 1 and a wavelength of a signal light which is not input to the signal light input port 1 (S1 in FIG. 5).

Similarly to the conventional wavelength selective optical switch, the intensity of the wavelength signal lights which are input to the signal light input port 1 is detected by the respective optical spectrum monitors 15 respectively connected to the signal light output ports 2 via the optical branching devices $16_2$. According to detection results, the control circuit 17 feedback controls the angles of the micro-mirrors 8 corresponding to the respective wavelengths so that the output intensity of the respective wavelengths in the desired signal light output ports 2 becomes a predetermined value or maximum, and the feedback controlled angles of the micro-mirrors are maintained (S2 in FIG. 5). Here, since the control circuit 17 gains the wavelength of the signal light which is not input to the signal light input port 1, which micro-mirror 8 on the mirror array 7 should be controlled, can be judged by the control circuit 17. FIG. 4 shows one example of the statuses of the micro-mirrors 8 at this time, the angles of the micro-mirrors 8 are controlled so that a particular wavelength signal light input to the signal light input port 1 is coupled to the fifth signal light output port 2 from the top.

On the other hand, in the conventional wavelength selective optical switch, since the light of the wavelength (dark channel) of the signal light which is not input to the signal light input port 1 does not reach the mirror corresponding to this wavelength, the feedback control of the angles of the corresponding micro-mirror 8 as described above could not be performed. However, in the present wavelength selective optical switch, the monitor light from the internal light source 12 reaches the micro-mirrors 8 via the monitor light input port 10, the diffraction grating 5 and the lens 6. Therefore, the intensity of the monitor light coupled to the monitor light output port 11 is detected by the monitor light intensity monitor 13 connected to the monitor light output port 11, and based on a detection result, the control circuit 17 can control the angle of the micro-mirror 8 corresponding to the dark channel to maintain the micro-mirror 8 at a particular angle, so that the output intensity in the monitor light output port 11 becomes maximum (S3 in FIG. 5).

Here, in the case where a plurality of dark channels exists, if the monitor light intensity monitor 13 is an optical spectrum monitor, it is easy to feedback control the angles of the micro-mirrors 8 corresponding to the plurality of dark channels independently and simultaneously, by a plurality of control circuits. Further, even if the monitor light intensity monitor 13 is an optical intensity monitor, such as a single PD element, for detecting the intensity of all wavelengths independent of the wavelengths, the angles of the micro-mirrors 8 corresponding to the plurality of dark channels may be sequentially feedback controlled, so that the total optical intensity detected by the optical intensity monitor becomes maximum. In this case, since an expensive optical spectrum monitor does not need to be particularly used, it becomes possible to realize the wavelength selective optical switch of lower cost. Note, in the present wavelength selective optical switch, since the broadband white light source is used as the internal light source 12, the light in the whole wavelength region (strictly speaking, the total range of a band of the white light source) is split by the diffraction grating 5, and the monitor light reaches all of the micro-mirrors 8. Therefore, it is possible to feedback control all of the micro-mirrors 8 according to the output intensity of the monitor light.

FIG. 2 shows one example of a status where the micro-mirror 8 corresponding to the dark channel is feedback controlled according to the output intensity of the monitor light, in which the angle of the micro-mirror 8 is controlled so that the monitor light input to the monitor light input port 10 is coupled to the monitor light output port 11.

Next, consideration is made on the case where a signal light which has not been input to the signal light input port 1 is newly input. In this case, as shown in FIG. 3, the signal light newly input to the signal light input port 1 is reflected by the micro-mirror 8 corresponding to the wavelength thereof, to return to the signal light output port 2 side. However, according to the arrangement of the signal light input port 1, the signal light output ports 2, the monitor light input port 10 and the monitor light output port 11 as in the present wavelength selective optical switch, as shown in FIG. 3, since the reflected light of the signal light reaches below the monitor light input port 10, the signal lights is not coupled to any port. Thus, in the present wavelength selective optical switch, the crosstalk does not occur even when the new wavelength signal light is input to the signal light input port 1.

Further, in the present wavelength selective optical switch, since the broadband white light source is used as the internal light source 12, the monitor light reaches all the micro-mirrors 8. Therefore, it becomes necessary that the monitor light for the wavelengths of the signal lights which are originally input to the signal light input port 1 is neither coupled to the signal light input port 1 nor the signal light output ports 2. With regard to this, as shown in FIG. 4, in the arrangement of each port in the present wavelength selective optical switch, since the monitor light reflected by the micro-mirrors 8 which are feedback controlled according to the intensity of the signal lights coupled to the signal light output ports 2, reaches above the signal light input port 1, the monitor light is not coupled to any port.

Note, herein, the broadband white light source is used as the internal light source 12. However, it is also possible to use a light source capable of emitting only a light of particular wavelength, for example, a wavelength variable laser light source, a wavelength variable light source made up by combining the broadband white light source and a wavelength variable filter or the like, as the internal light source 12. In this case, if the monitor light is output from the internal light source 12 only for the wavelength of the signal light which is not input to the signal light input port 1, the monitor light is neither coupled to the signal light input port 1 nor the signal light output ports 12. However, from the view point of the cost of the wavelength selective optical switch, it is more advantageous to use the broadband white light source whose cost is lower than the wavelength variable laser light source or the like, as the internal light source 12.

In the operation after the new wavelength signal light is input to the signal light input port 1, the wavelength of the new wavelength signal light is detected by the wavelength detector 14, and a detection result thereof is transmitted to the control circuit 17 (S4 in FIG. 5). Then, the control circuit 17 suspends the above described feedback control according to the output intensity of the monitor light for the micro-mirror 8 corresponding to the new wavelength detected by the wavelength detector 14, and sets the angle of the corresponding micro-mirror 8 at an initial value corresponding to the signal light output port 2 which is the determination of the new wavelength signal light, and thereafter, performs the feedback control according to the output intensity of the signal light coupled to this signal light output port 2 (S5 in FIG. 5).

In the case where the switching of determination for the wavelength signal light which is originally input to the signal light input port 1 is required, the control circuit 17 sets the angle of the corresponding micro-mirror 8 at an initial value corresponding to the signal light output port 2 which is the new determination, and thereafter, performs the feedback control according to the output intensity of the signal light coupled to this signal light output port 2 (S6 in FIG. 5).

Then, when the signal light which has been input to the signal light input port 1 is not input, the wavelength of such a signal light is detected by the wavelength detector 14 (S7 in FIG. 5), and the control circuit 17 suspends the feedback control for the micro-mirror 8 corresponding to the wavelength according to the output intensity of the signal light, to switch the control to the feedback control according to the output intensity of the monitor light (S8 in FIG. 5). After the feedback control for the micro-mirror 8 is switched, the above described operation in the case where the signal light is not input to the signal light input port 1 is repetitively performed (S3 to S5 in FIG. 5).

As described in the above, according to the wavelength selective optical switch in the first embodiment, it becomes possible to more reliably avoid, with a simple configuration, the crosstalk which conventionally has a possibility to occur when the new wavelength signal light is input.

Next, there will be described a second embodiment of the wavelength selective optical switch according to the present invention.

Figure 6:
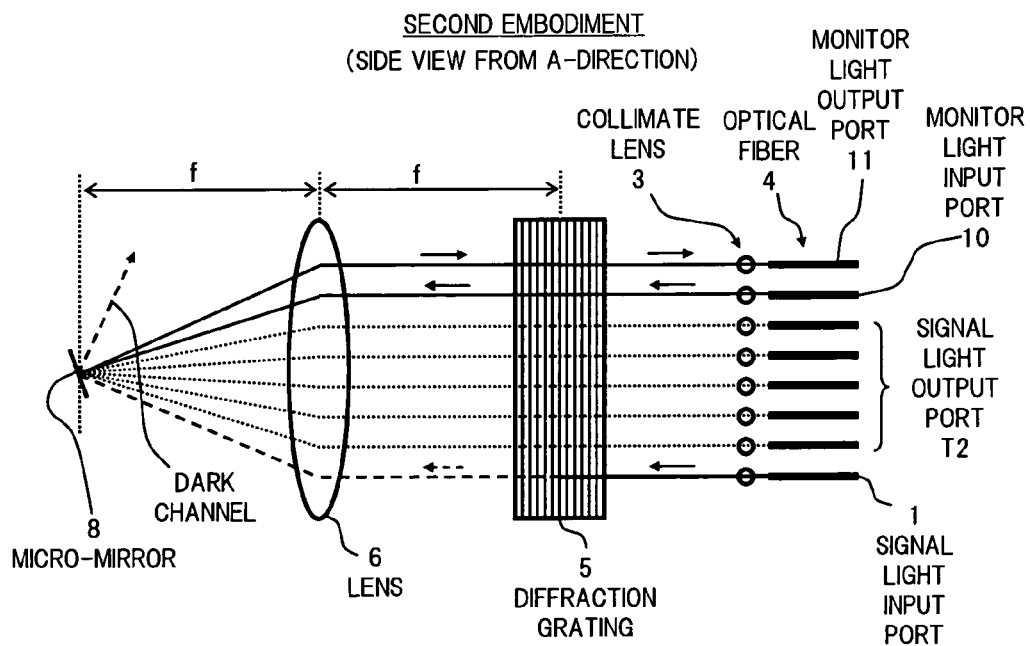
FIG. 6 is a side view for explaining a configuration and an operation of a main body portion in a second embodiment according to the present invention.
Figure 7:
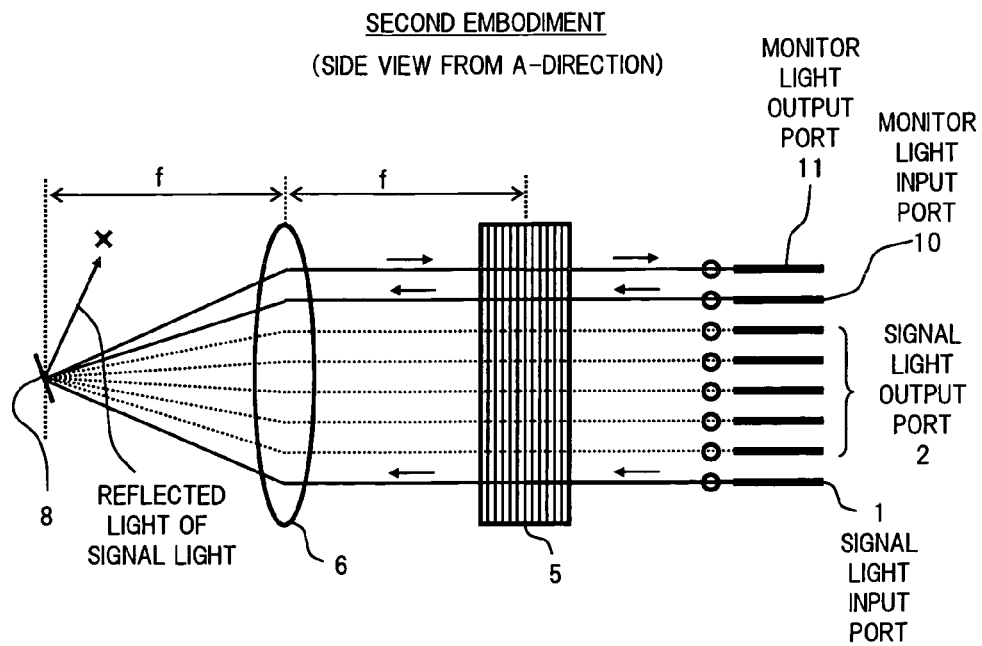
FIG. 7 is another side view for explaining an operation of the second embodiment.
Figure 8:
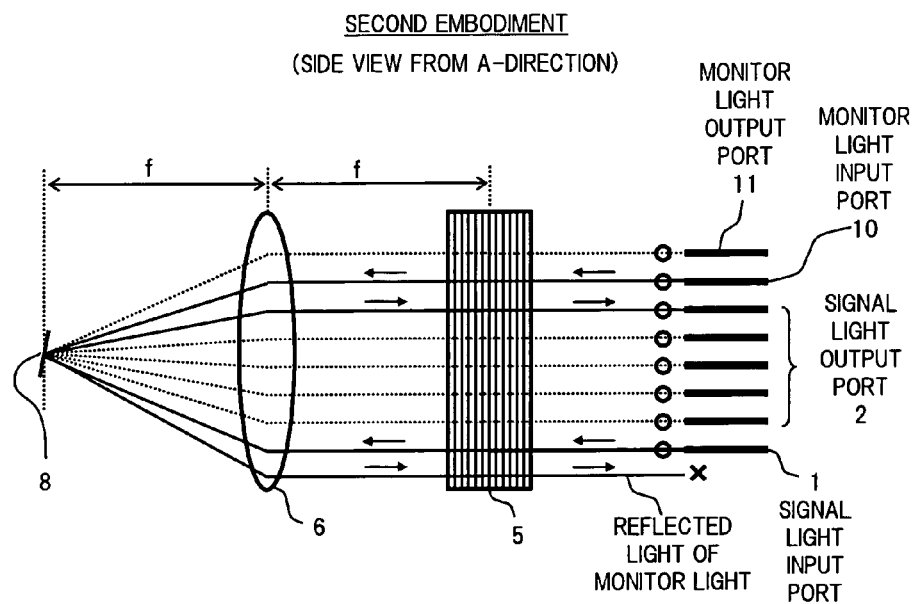
FIG. 8 is a further side view for explaining the operation of the second embodiment.

FIG. 6 to FIG. 8 are side views showing a configuration of a main part of the wavelength selective optical switch in the second embodiment. Note, the entire configuration of the present wavelength selective optical switch is similar to that in the first embodiment shown in FIG. 1, and therefore, the description thereof is omitted.

As shown in each figures, the present wavelength selective optical switch is made up by making-the spatial arrangement of each port in the first embodiment different. The configuration other than the arrangement of each port is similar to that in the first embodiment. To be specific, in the present wavelength selective optical switch, the monitor light output port 11, the monitor light input port 10, the plurality of signal light output ports 2 and the signal light input port 1 are arranged at substantially even spaces on a straight line in this order.

Even in the arrangement of each port as described above, as apparent from an optical path for the dark channel indicated by the broken line in FIG. 6 and an optical path for the reflected light of the signal light indicated by the solid line in FIG. 7, since the wavelength signal light newly input to the signal light input port 1 is not coupled to any port, the crosstalk does not occur even if the new wavelength signal light is input. Further, as shown in an optical path for the reflected light of the monitor light indicated by the solid line in FIG. 8, the monitor light for the wavelength of the signal light input to the signal light input port 1, which is reflected by the micro-mirror 8 feedback controlled according to the signal light output intensity, is neither coupled to the signal light input port 1 nor the signal light output ports 2.

However, in the arrangement of each port in the second embodiment, the angular movable range of each micro-mirror 8 becomes twice the angular movable range in the first embodiment. Therefore, from the view point that the angular movable range of each micro-mirror 8 is narrowed to suppress the drive electricity for the micro-mirrors 8, and the switching operation of optical paths is accelerated, the configuration in the first embodiment is more advantageous than that in the second embodiment.

Note, even in the port arrangement in which each port is arranged in reverse to the order in the second embodiment, the port arrangement in which the monitor light input port 10, the monitor light output port 11, the plurality of signal light output ports 2 and the signal light input port 1 are arranged in this order, or the port arrangement in which each port is arranged in reverse to this order, it is possible to achieve the effect similar to that in the second embodiment.

Next, there will be described a third embodiment of the wavelength selective optical switch according to the present invention.

Figure 9:
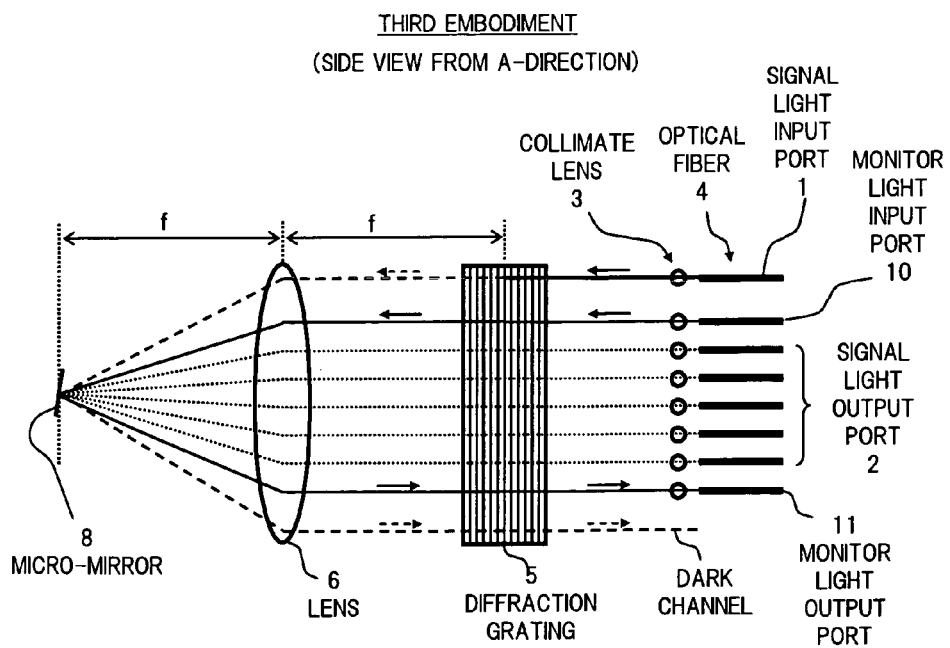
FIG. 9 is a side view for explaining a configuration and an operation of a main body portion in a third embodiment according to the present invention.
Figure 10:
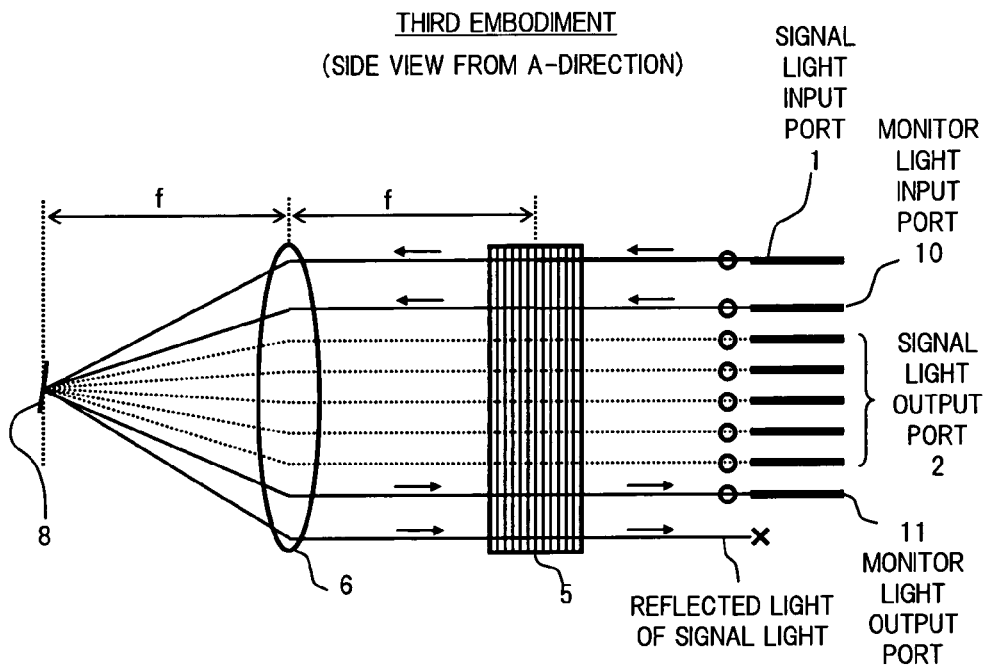
FIG. 10 is another side view for explaining an operation of the third embodiment.
Figure 11:
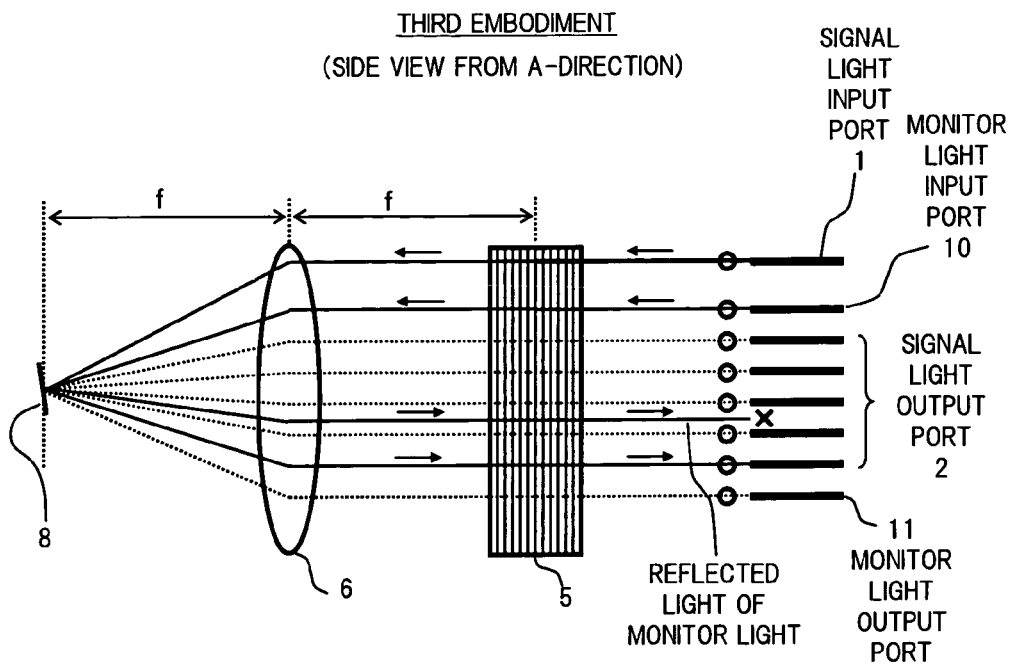
FIG. 11 is a further side view for explaining the operation of the third embodiment.

FIG. 9 to FIG. 11 are side views showing a configuration of a main part of the wavelength selective optical switch in the third embodiment. Note, the entire configuration of the present wavelength selective optical switch is similar to that in the first embodiment shown in FIG. 1, and therefore, the description thereof is omitted.

As shown in each figures, the present wavelength selective optical switch is made up by making the spatial arrangement of each port in the first or second embodiment different. The configuration other than the arrangement of each port is similar to that in the first or second embodiment. To be specific, in the present wavelength selective optical switch, the signal light input port 1, the monitor light input port 10, the plurality of signal light output ports 2 and the monitor light output port 11 are arranged on a straight line in this order. However, according to such an order of each port, in the case where each port is arranged at even spaces and also the broadband white light source is used as the internal light source 12, the monitor light for the wavelength of the signal light input to the signal light input port 1, which is reflected by the micro-mirror 8 feedback controlled according to the signal light output intensity, is coupled to the signal light input port 1 and the signal light output port 2. In order to avoid such a situation, in the present embodiment, as shown in FIG. 9, the plurality of signal light output ports 2 is arranged at substantially even spaces, and also, the signal light input port 1 and the monitor light input port 10 are arranged on a straight line at the space which is different from the integral multiple of the arrangement space of each signal light output port 2. To be specific, the space between the signal light input port 1 and the monitor light input port 10 is set to be about 1.5 times of the arrangement space of each signal light output port 2.

Incidentally, in order to avoid the coupling of the monitor light to the signal light input port 1 and the signal light output port 2, it is also possible to emit from the internal light source 12 the monitor light only for the wavelength of the signal light which is not input to the signal light input port 1, using for example the wavelength variable laser light source or the wavelength variable light source made up by combining the broadband white light source and the wavelength variable filter as the internal light source 12, as described in the above, in place of the application of the above port arrangement. However, the avoidance measure in which the arrangement of each port is devised as shown in the present embodiment is advantageous in cost performance, since it is possible to use the broadband white light source whose cost is lower than the wavelength variable laser light source or the like.

In the wavelength selective optical switch to which the port arrangement as described above is applied, as shown in an optical path for the reflected light of the monitor light indicated by the solid line in FIG. 11, even in the case where the broadband white light source is used as the internal light source 12, the monitor light for the wavelength of the signal light input to the signal light input port 1, which is reflected by the micro-mirror 8 feedback controlled according to the signal light output intensity, reaches just the intermediate position between the third and fourth signal light output ports 2 from the top, and therefore, is hardly coupled to the signal light output port 2. Accordingly, any practical issue does not occur.

Further, as apparent from an optical path for the dark channel indicated by the broken line in FIG. 9 and an optical path for the signal light indicated by the solid line in FIG. 10, the wavelength signal light newly input to the signal light input port 1 is not coupled to any port. Therefore, even if the new wavelength signal light is input, the crosstalk does not occur.

However, also in the arrangement of each port in the third embodiment, since the angular movable range of each micro-mirror 8 is slightly broader than that in the first embodiment. Therefore, from the view point of the angular movable range of the micro-mirror, the configuration in the first embodiment is more advantageous than that in the third embodiment.

Similarly to the second embodiment, it is possible to achieve the effect similar to that in the third embodiment in the case where the port arrangement is made in reverse to the order in the third embodiment.

Next, there will be described a fourth embodiment of the wavelength selective optical switch according to the present invention.

Figure 12:
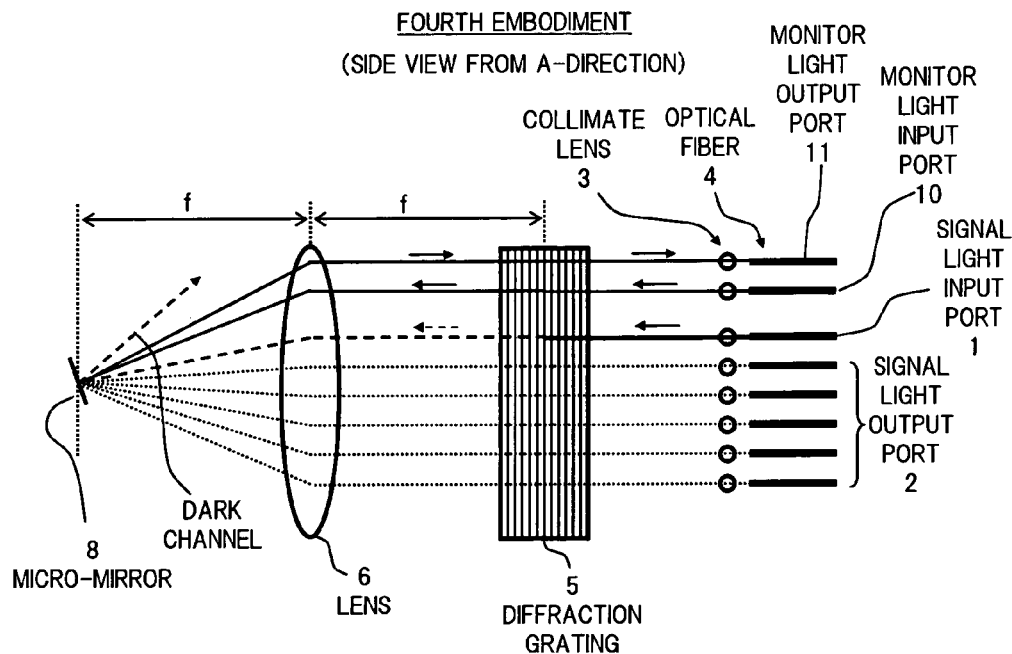
FIG. 12 is a side view for explaining a configuration and an operation of a main body portion in a fourth embodiment according to the present invention.
Figure 13:
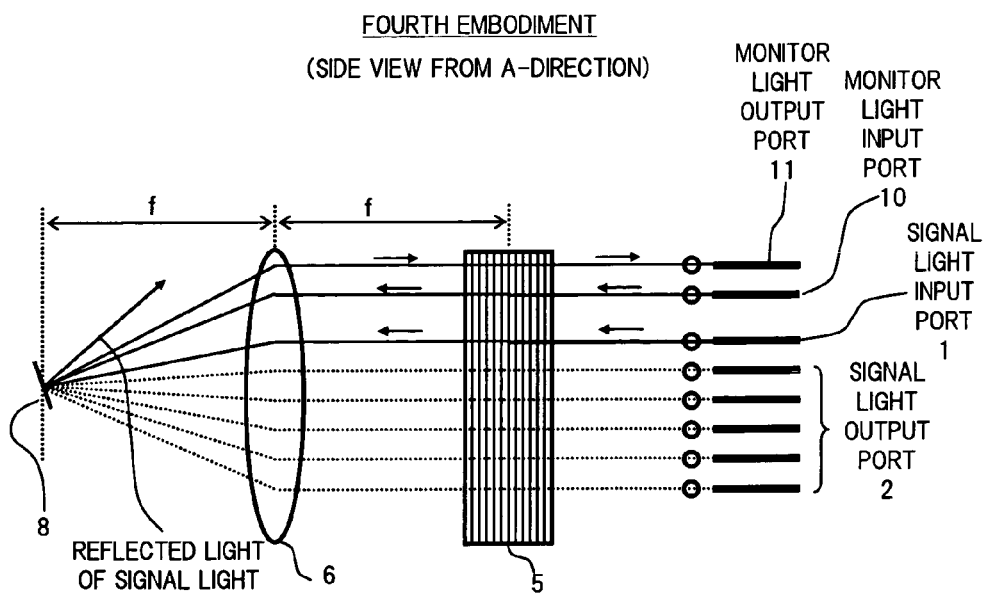
FIG. 13 is another side view for explaining an operation of the fourth embodiment.
Figure 14:
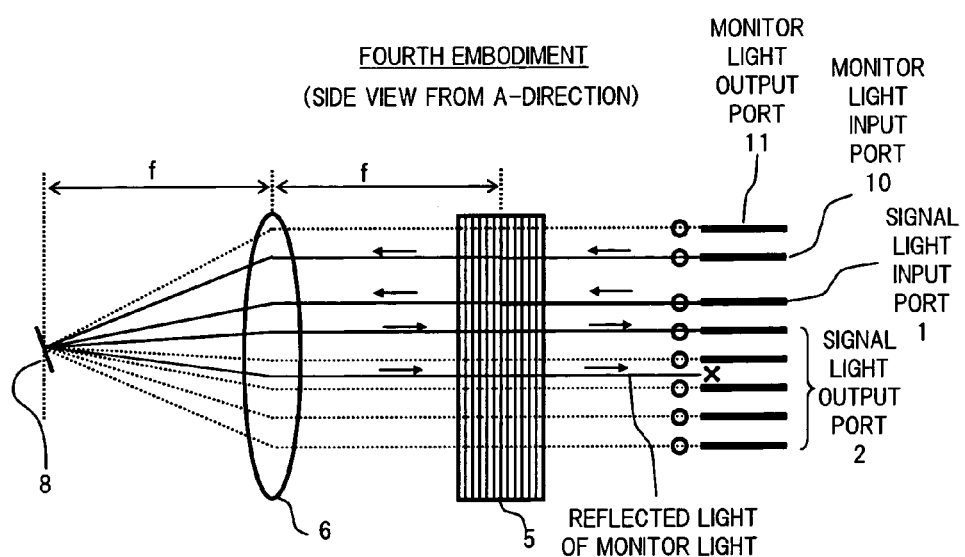
FIG. 14 is a further side view for explaining the operation of the fourth embodiment.

FIG. 12 to FIG. 14 are side views showing a configuration of a main part of the wavelength selective optical switch in the fourth embodiment. Note, the entire configuration of the present wavelength selective optical switch is similar to that in the first embodiment shown in FIG. 1, and therefore, the description thereof is omitted.

As shown in each figures, the present wavelength selective optical switch is made up by making the spatial arrangement of each port in each of the first to third embodiments different. The configuration other than the arrangement of each port is similar to that in each of the first to third embodiments. To be specific, in the present wavelength selective optical switch, the monitor light output port 11, the monitor light input port 10, the signal light input port 1 and the plurality of signal light output port 2 are arranged on a straight line in this order. Also, similar to the third embodiment, the space between the signal light input port 1 and the monitor light input port 10 is set to be about 1.5 times of the arrangement space of each signal light output port 2.

Also in the above described arrangement of each port, as apparent from an optical path for the dark channel indicated by the broken line in FIG. 12 and an optical path for the reflected light of the signal light indicated by the solid line in FIG. 13, since the wavelength signal light newly input to the signal light input port 1 is not coupled to any port, the crosstalk does not occur even if the new wavelength signal light is input. Further, as apparent from an optical path for the reflected light of the monitor light indicated by the solid line in FIG. 14, even if the broadband white light source is used as the internal light source 12, the monitor light for the signal light input to the signal light input port 1, which is reflected by the micro-mirror 8 feedback controlled according to the signal light output intensity, reaches just the intermediate position between the second and third signal light output ports 2 from the top, and therefore, is hardly coupled to the signal light output port 2. Accordingly, the practical issue does not occur.

However, since the angular movable range of each micro-mirror 8 in the arrangement of each port in the third embodiment is broader than that in the third embodiment. Therefore, from the view point of the angular movable range of the micro-mirror 8, the configuration in the first or third embodiment is more advantageous than that in the fourth embodiment.

Note, even in the port arrangement in which each port is arranged in reverse to the order in the fourth embodiment, the port arrangement in which the monitor light input port 10, the monitor light output port 11, the signal light input port 1 and the plurality of signal light output ports 2 are arranged in this order, or the port arrangement in which each port is arranged in reverse to this order, it is possible to achieve the effect similar to that in the fourth embodiment.

Next, there will be described a fifth embodiment of the wavelength selective optical switch according to the present invention.

Figure 15:
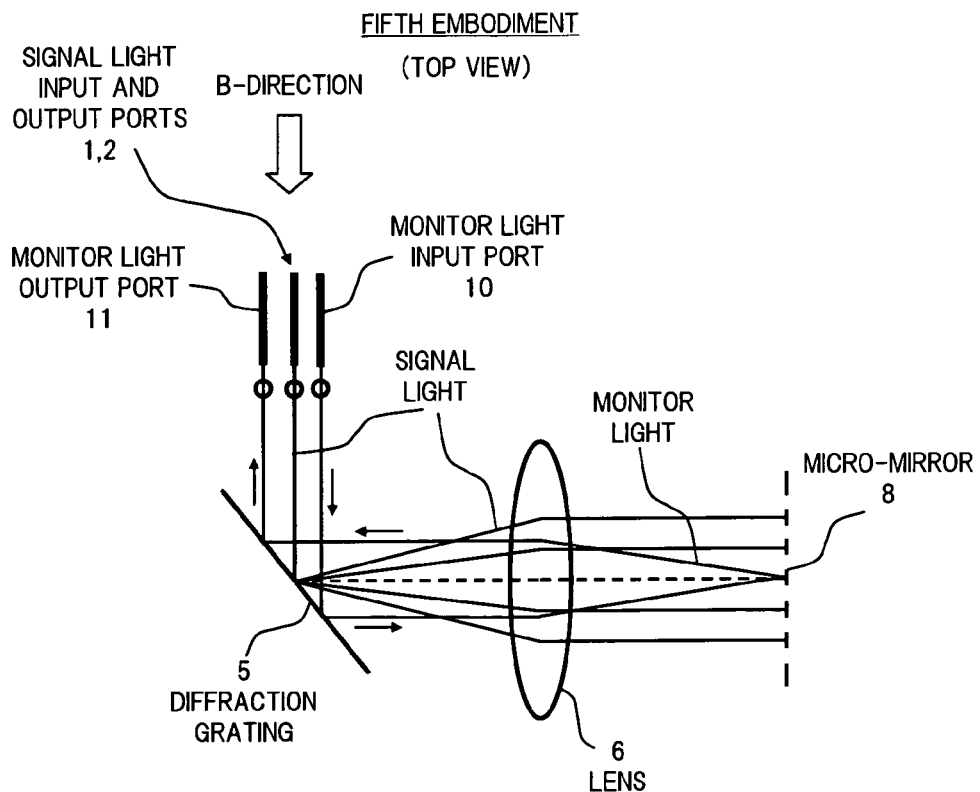
FIG. 15 is a top view for explaining a configuration and an operation of a main body portion in a fifth embodiment according to the present invention.
Figure 16:
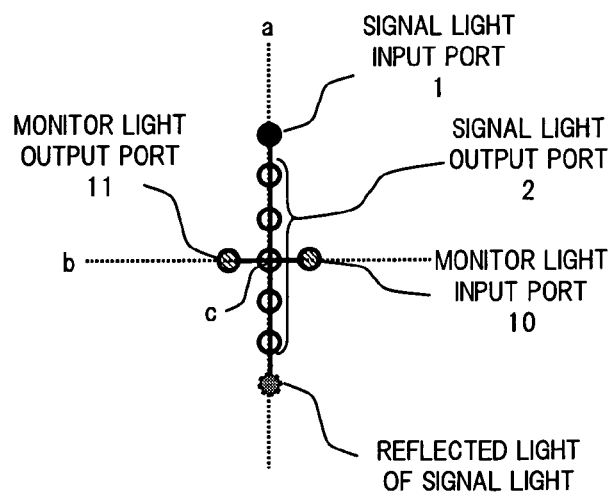
FIG. 16 is a side view showing the vicinity of each port in FIG. 15 from B-direction.
Figure 17:
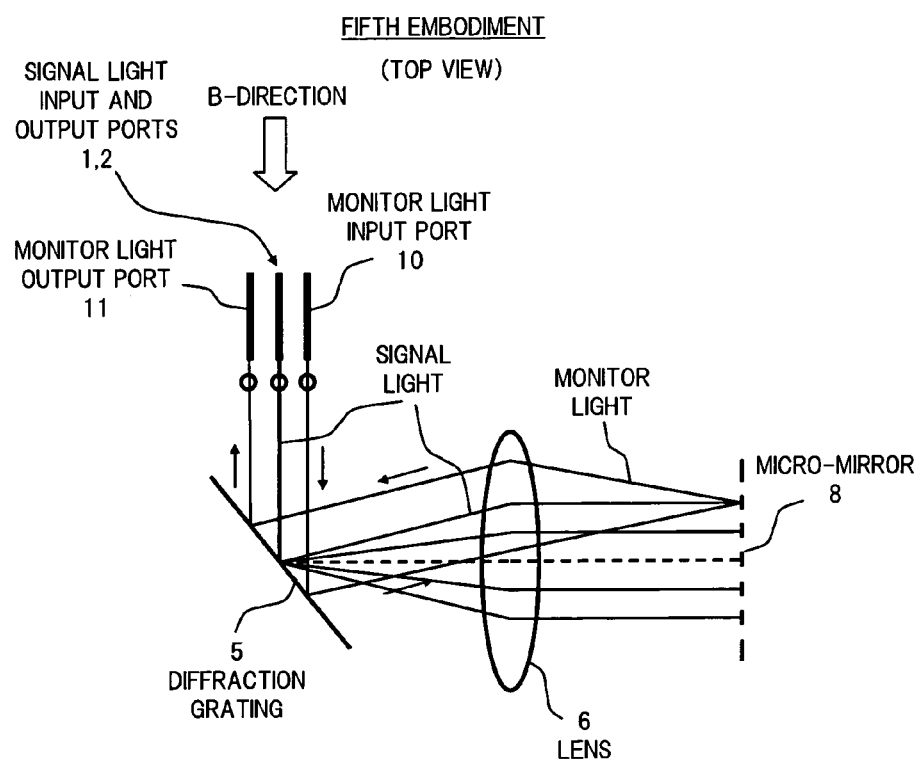
FIG. 17 is another top view for explaining an operation of the fifth embodiment.
Figure 18:
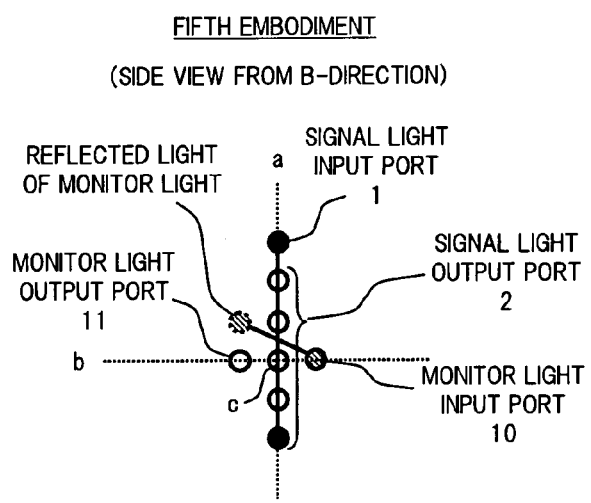
FIG. 18 is a side view showing the vicinity of each port in FIG. 17 from B-direction.

FIG. 15 and FIG. 17 are top views showing a configuration of a main part of the wavelength selective optical switch in the fifth embodiment. FIG. 16 and FIG. 18 are side views of a configuration of the vicinity of each port of FIG. 15 and FIG. 17 viewed from B-direction. Note, the entire configuration of the present wavelength selective optical switch is similar to that in the first embodiment shown in FIG. 1, and therefore, the description thereof is omitted.

As shown in each figures, the present wavelength selective optical switch is made up by making the spatial arrangement of each port in each of the first to fourth embodiments different. The configuration other than the arrangement of each port is similar to that in each of the first to fourth embodiments. To be specific, in the present wavelength selective optical switch, the signal light input port 1 and the plurality of signal light output ports 2 are arranged on a straight line "a", and the monitor light input port 10 and the monitor light output port 11 are arranged on a straight line "b" orthogonal to the straight line "a". Further, when the intersection of the straight lines "a" and "b" is "c", the monitor light input port 10 and the monitor light output port 11 are arranged so that the intersection "c" is located on the opposite side to the signal light input port 1 from the intermediate position of the plurality of signal light output ports 2 (FIG. 16).

In the above described arrangement of each port, the micro-mirror 8 corresponding to the wavelength of the signal light which is not input to the signal light input port 1 (broken line in FIG. 15) is feedback controlled so that the output intensity of the monitor light which is coupled to the monitor light output port 11 (solid line in FIG. 15) becomes maximum. Then, when the signal light which has not been input to the signal light input port 1 is newly input, the reflected light of this signal light by the above micro-mirror 8 is deviated below the plurality of the signal light output ports 2, as indicated by the broken-lined circle on the bottom side in FIG. 16. Therefore, even if the new wavelength signal light is input, the crosstalk does not occur.

Further, according to the arrangement of each port in the present wavelength selective optical switch, even if the broadband white light source is used as the internal light source 12, the monitor light for the wavelength of the signal light input to the signal light input port 1, which is reflected by the micro-mirror 8 feedback controlled according to the signal light output intensity (for example, the micro-mirror positioned on the top (the rightmost to the lens 6) of the plurality of micro-mirrors to which the light is radiated in FIG. 17), is deviated from the straight line "a" as indicated by the broken-lined circle on the left middle in FIG. 18. Therefore, the monitor light corresponding to the wavelength of the signal light input to the signal light input port 1 is neither coupled to the signal light input port 1 nor the signal light output ports 2.

Incidentally, in the fifth embodiment as described above, since each port are two-dimensionally arranged, compared to the first to fourth embodiments, the adjustment of each port is slightly difficult. However, the size in the direction of the straight line "a" on which the signal light input port 1 and the plurality of signal light output ports 2 are arranged, can be made smaller than that in each of the first to fourth embodiment.

Next, there will be described a sixth embodiment of the wavelength selective optical switch according to the present invention.

Figure 19:
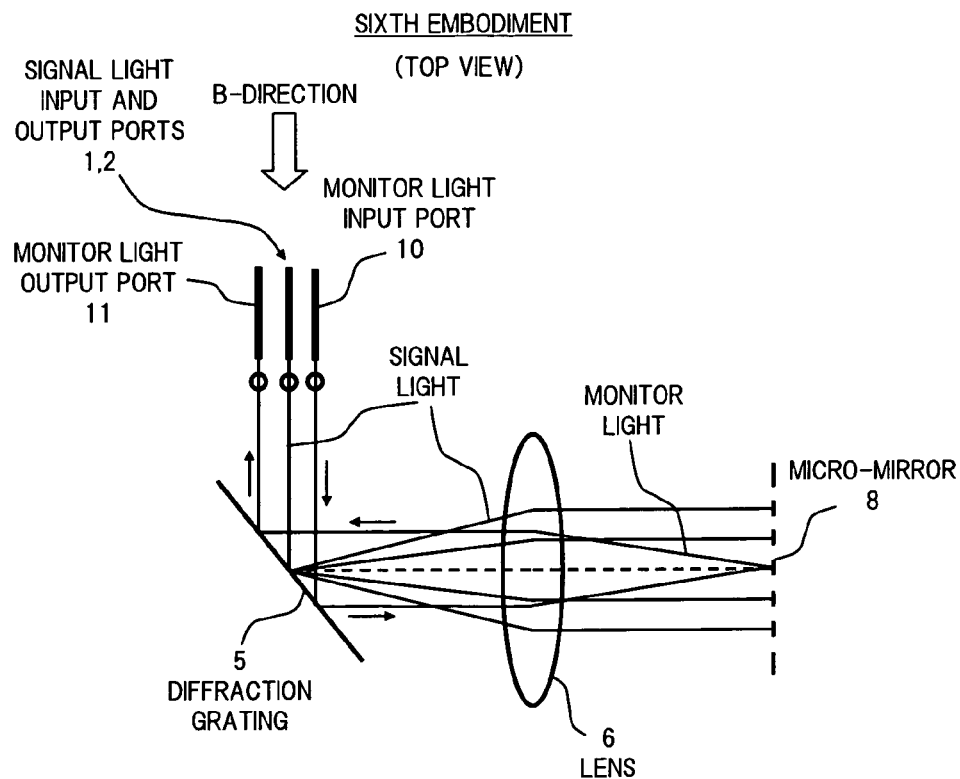
FIG. 19 is a top view for explaining a configuration and an operation of a main body portion in a sixth embodiment according to the present invention.
Figure 20:
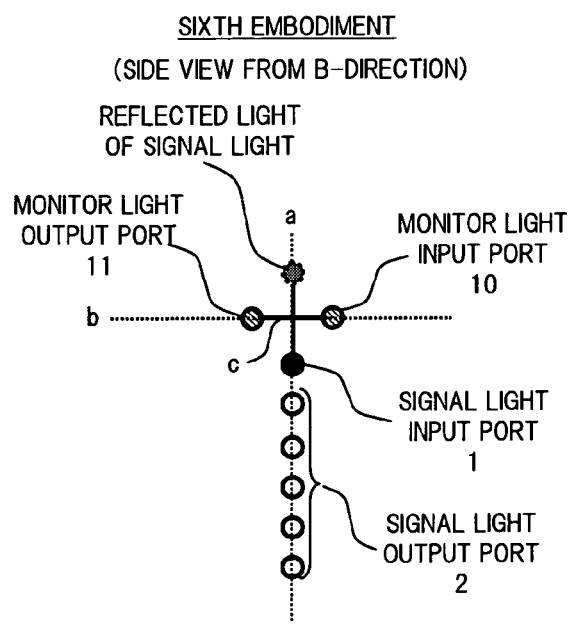
FIG. 20 is a side view showing the vicinity of each port in FIG. 19 from B-direction.
Figure 21:
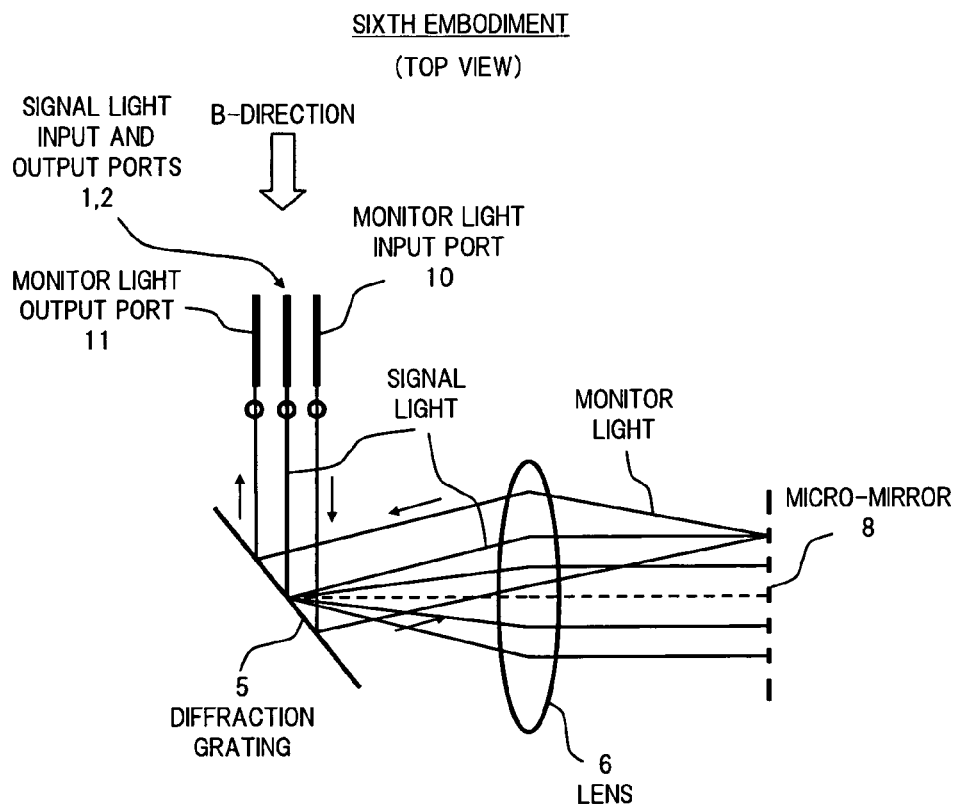
FIG. 21 is another top view for explaining an operation of the sixth embodiment.
Figure 22:
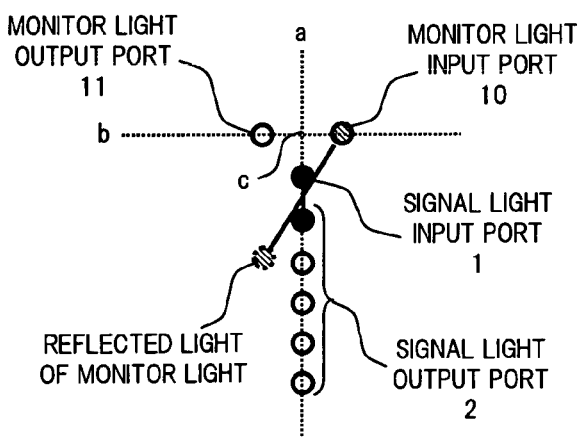
FIG. 22 is a side view showing the vicinity of each port in FIG. 21 from B-direction.

FIG. 19 and FIG. 21 are top views showing a configuration of a main part of the wavelength selective optical switch in the sixth embodiment. FIG. 20 and FIG. 22 are side views of a configuration of the vicinity of each port of FIG. 19 and FIG. 21 viewed from B-direction. Note, the entire configuration of the present wavelength selective optical switch is similar to that in the first embodiment shown in FIG. 1, and therefore, the description thereof is omitted.

As shown in each figures, the present wavelength selective optical switch is made up by making the spatial arrangement of each port in each of the first to fifth embodiments different. The configuration other than the arrangement of each port is similar to that in each of the first to fifth embodiments. To be specific, in the present wavelength selective optical switch, the signal light input port 1 and the plurality of signal light output ports 2 are arranged on a straight line "a", and the monitor light input port 10 and the monitor light output port 11 are arranged on a straight line "b" orthogonal to the straight line "a". The arrangement up to this is similar to that in the above described fifth embodiment. The difference of the sixth embodiment from the fifth embodiment is in that the position of the intersection "c" when the intersection of the straight lines "a" and "b" is "c", is arranged on the outer side of the signal light input port 1 and the plurality of signal light output ports 2. Here, as shown in FIG. 20, the monitor light input port 10 and the monitor light output port 11 are arranged so that the intersection "c" is located above the signal light input port 1 arranged on the top.

In the above described arrangement of each port, the micro-mirror 8 corresponding to the wavelength of the signal light which is not input to the signal light input port 1 (broken line in FIG. 19) is feedback controlled so that the output intensity of the monitor light which is coupled to the monitor light output port 11 (solid line in FIG. 19) becomes maximum. Then, when the signal light which has not been input to the signal light input port 1 is newly input, this signal light is deviated above on the opposite side to the plurality of the signal light output ports 2 as indicated by the broken-lined circle on the upper side of FIG. 20. Therefore, even if the new wavelength signal light is input, the crosstalk does not occur.

Further, according to the arrangement of each port in the present wavelength selective optical switch, even if the broadband white light source is used as the internal light source 12, the monitor light for the wavelength of the signal light input to the signal light input port 1, which is reflected by the micro-mirror 8 feedback controlled according to the signal light output intensity (for example, the micro-mirror positioned on the top (the rightmost to the lens 6) of the plurality of micro-mirrors to which the light is radiated in FIG. 21), is deviated from the straight line "a" as indicated by the broken-lined circle on the left middle in FIG. 22. Therefore, the monitor light corresponding to the wavelength of the signal light input to the signal light input port 1 is neither coupled to the signal light input port 1 nor the signal light output ports 2.

Incidentally, as a specific configuration of the wavelength detector 14 which is commonly used in the first to sixth embodiments, it is possible to use an optical spectrum monitor comprising a spectral element for separating the light input to the signal light input port 1 for each wavelength and a light receiving element array for receiving the, lights of respective wavelengths separated by the spectral element, an optical spectrum monitor comprising a wavelength variable filter for extracting a particular wavelength and a light receiving element for receiving the light extracted from the wavelength variable filter, or the like. Further, even in the case where the optical spectrum monitor is used as the monitor light intensity monitor 13, it is possible to use the one similar to the specific configuration of the wavelength detector 14.

Moreover, in the above described first to sixth embodiments, there has been shown the case where the signal light input port 1 is arranged on the outer side of the plurality of signal light output ports 2. However, it is surely possible to arrange the signal light input port 1 between the signal light output ports 2. However, typically, the plurality of signal light output ports 2 is often subjected to the collective optical axis adjustment. Therefore, in view of the facility of optical axis adjustment, the port arrangement in the first to sixth embodiments is advantageous.

Furthermore, the wavelength selective optical switch of the present invention is not limited to the one in each of the first to sixth embodiments, and it is apparent that the person skilled in the art can modify the wavelength selective optical switch within a range defined in claims and within a range of the equivalence thereof, based on the principle of the present invention.

What is claimed is:

1. A wavelength selective optical switch which includes optical path switching means provided with a plurality of mirrors on which signal lights of respective wavelengths contained in a wavelength division multiplexed light are incident, for controlling angular variable reflecting surfaces of said respective mirrors to switch optical paths for the signal lights reflected by said respective mirrors to arbitrary directions for each wavelength, comprising:
    wavelength detecting means for detecting the wavelengths of the signal lights input to said optical path switching means, by using an optical spectrum monitor;
    monitor light generating means for generating a monitor light for monitoring and controlling the reflecting surface angles of said plurality of mirrors, irrespectively of the wavelengths of the signal lights input to said optical path switching means;
    a monitor light input port to which the monitor light from said monitor light generating means is input;
    a monitor light output port to which the monitor light emitted from said monitor light input port and reflected by said respective mirrors of said optical path switching means is coupled;
    monitor light intensity detecting means for detecting the intensity of the monitor light output from said monitor light output port; and
    control means for feedback controlling, for the wavelength of the signal light, which is not input to said optical path switching means, the reflecting surface angle of the corresponding mirror in said optical path switching means based on detection results of said wavelength detecting means and said monitor light intensity detecting means, so that the intensity of the monitor light output from said monitor light output port becomes maximum.

2. A wavelength selective optical switch according to claim 1,
    wherein said optical path switching means includes:
    a signal light input port to which said wavelength division multiplexed light is input;
    a spectral element for separating the signal lights of respective wavelengths emitted from said signal light input port to a first direction according to the wavelengths;
    a lens for condensing the signal lights of respective wavelengths separated by said spectral element on positions different from each other;
    a mirror array provided with said plurality of mirrors on the condensing positions of the signal lights of respective wavelengths condensed by said lens; and
    a plurality of signal light output ports arranged in a second direction which is different from said first direction, to which the signal lights reflected by the respective mirrors of said mirror array are respectively coupled via said lens and said spectral element.

3. A wavelength selective optical switch according to claim 2,
    wherein said monitor light output port, said monitor light input port, said plurality of signal light output ports and said signal light input port are arranged on a straight line in this order or in reverse to this order.

4. A wavelength selective optical switch according to claim 2,
    wherein said monitor light input port, said monitor light output port, said plurality of signal light output ports and said signal light input port are arranged on a straight line in this order or in reverse to this order.

5. A wavelength selective optical switch according to claim 2,
    wherein said signal light input port, said monitor light output port, said plurality of signal light output ports and said monitor light input port are arranged on a straight line in this order or in reverse to this order.

6. A wavelength selective optical switch according to claim 2,
    wherein positions of said monitor light input port and said monitor light output port relative to positions of said signal light input port and said plurality of signal light output ports are determined so that, when the signal light which is newly input to said signal light input port is reflected by the mirror whose reflecting surface angle is feedback controlled by said control means, a reflected light of said signal light reaches to the outside of said plurality of signal light output ports.

7. A wavelength selective optical switch according to claim 6,
    wherein said monitor light generating means generates the monitor light using a white light source, and
    positions of said monitor light input port and said monitor light output port relative to positions of said signal light input port and said plurality of signal light output ports are determined so that, when the monitor light of a wavelength same as that of the signal light input to said signal light input port, which is contained in a white light emitted from said monitor light input port, is reflected by said mirror whose reflecting surface angle is controlled so that said signal light input to said signal light input port is coupled to said signal light output port which is set as the determination of said signal light, a reflected light of said monitor light reaches the outside of said signal light input port and said plurality of signal light output ports.

8. A wavelength selective optical switch according to claim 7,
wherein said plurality of signal light output port is arranged at substantially even spaces, and
said signal light input port and said monitor light input port are arranged at the space which is different from the integral multiple of the space between each of said signal light output ports.

9. A wavelength selective optical switch according to claim 8,
wherein said signal light input port and said monitor light input port are arranged at the space of 1.5 times the space between each of said signal light output ports.

10. A wavelength selective optical switch according to claim 8,
wherein said signal light input port, said monitor light input port, said plurality of signal light output ports and said monitor light output port are arranged on a straight line in this order or in reverse to this order.

11. A wavelength selective optical switch according to claim 8,
wherein said monitor light output port, said monitor light input port, said signal light input port and said plurality of signal light output ports are arranged on a straight line in this order or in reverse to this order.

12. A wavelength selective optical switch according to claim 8,
wherein said monitor light input port, said monitor light output port, said signal light input port and said plurality of signal light output ports are arranged on a straight line in this order or in reverse to this order.

13. A wavelength selective optical switch according to claim 2,
wherein said signal light input port and said plurality of signal light output ports are arranged on a first straight line, and
said monitor light input port and said monitor light output port are arranged on a second straight line orthogonal to said first straight line, and also the intersection of said first straight line and second straight line is arranged to be located on the opposite side to said signal light input port from the intermediate position of said plurality of signal light output ports.

14. A wavelength selective optical switch according to claim 2,
wherein said signal light input port and said plurality of signal light output ports are arranged on a first straight line, and
said monitor light input port and said monitor light output port are arranged on a second straight line orthogonal to said first straight line, and also, the intersection of said first straight line and said second straight line is arranged to be located on the outer side of said signal light input port and said plurality of signal light output ports.

15. A wavelength selective optical switch according to claim 2,
wherein said wavelength detecting means is an optical spectrum monitor including: an optical branching device, which is connected to said signal light input port, for branching a part of the wavelength division multiplexed signal light input to said signal light input port; a wavelength variable filter for extracting a signal light of particular wavelength from the light branched by said optical branching device; and a light receiving element for receiving the signal light extracted by said wavelength variable filter.

16. A wavelength selective optical switch according to claim 2,
wherein said wavelength detecting means is an optical spectrum monitor including: an optical branching device, which is connected to said signal light input port, for branching a part of the wavelength division multiplexed signal light input to said signal light input port; a spectroscope for separating the light branched by said optical branching device for each wavelength; and a light receiving element array for receiving the signal lights of respective wavelengths separated by said spectroscope.

17. A wavelength selective optical switch according to claim 1,
wherein said monitor light generating means generates the monitor light using a wavelength variable laser light source or a wavelength variable light source made up by combining a white light source and a wavelength variable filter.

18. A wavelength selective optical switch according to claim 1,
wherein said monitor light intensity detecting means is an optical intensity monitor including a light receiving element for receiving the monitor light containing a plurality of wavelength components, which is output from said monitor light output port, and
said control means feedback controls collectively the reflecting surface angles of said plurality of mirrors corresponding to the wavelengths of the signal lights which are not input to said optical path switching means, so that the intensity of the monitor light detected by said optical intensity monitor becomes maximum.

19. A wavelength selective optical switch according to claim 1,
wherein said monitor light intensity detecting means is an optical spectrum monitor including: a spectroscope for separating the monitor light containing a plurality of wavelength components, which is output from said monitor light output port, for each wavelength; and a light receiving element array for receiving the monitor lights of respective wavelengths separated by said spectroscope, and
said control means feedback controls the reflecting surface angles of said plurality of mirrors corresponding to the wavelengths of the signal lights which are not input to said optical path switching means, respectively, so that the intensity of the monitor lights of respective wavelengths detected by said optical spectrum monitor becomes maximum.

20. A wavelength selective optical switch according to claim 1,
wherein said monitor light intensity detecting means is an optical spectrum monitor including: a wavelength variable filter for extracting a particular wavelength component from the monitor light containing a plurality of wavelength components, which is output from said monitor light output port; and a light receiving element for receiving the monitor light extracted by said wavelength variable filter, and
said control means feedback controls the reflective surface angles of said plurality of mirrors corresponding to the wavelengths of the signal lights which are not input to said optical path switching means, respectively, so that the intensity of the monitor light detected by said optical spectrum monitor becomes maximum.

* * * * *